United States Patent [19]

Harrington

[11] 4,092,603
[45] May 30, 1978

[54] SYSTEM FOR OBTAINING PULSE COMPRESSION IN THE FREQUENCY DOMAIN

[75] Inventor: John B. Harrington, Los Alamitos, Calif.

[73] Assignee: Hughes Aircraft Company, Culver City, Calif.

[21] Appl. No.: 723,870

[22] Filed: Sep. 16, 1976

[51] Int. Cl.$^2$ .............................................. H04B 1/10
[52] U.S. Cl. .................................... 325/473; 325/323; 179/15.55 R
[58] Field of Search ..................... 325/41, 42, 65, 344, 325/345, 323, 324, 427, 473, 49, 50, 329, 330; 179/15.55 R; 343/17.2 PC

[56] References Cited

U.S. PATENT DOCUMENTS

| | | | |
|---|---|---|---|
| 2,683,213 | 7/1954 | Earp | 325/345 |
| 3,290,600 | 12/1966 | Malnar | 325/345 |
| 3,757,331 | 9/1973 | Moulton | 343/17.2 PC |
| 3,766,477 | 10/1973 | Cook | 325/344 |

*Primary Examiner*—Robert L. Griffin
*Assistant Examiner*—Jin F. Ng

*Attorney, Agent, or Firm*—Lawrence V. Link, Jr.; W. H. MacAllister

[57] ABSTRACT

The pulse envelope of a chirped or phase coded pulse is separated from the phase modulation in such a way that the bandwidth of the signal output is decreased while the pulse width is maintained. This result is accomplished by injecting the pulse into two mixers coupled in parallel. The first mixer combines the coded pulse with a constant frequency signal generated by a local oscillator to obtain a resultant signal having an upper sideband whose phase is the sum of the phases of the coded pulse and a lower sideband whose phase is the difference between the phases of the two signals injected into the first mixer. The lower sideband of the resultant signal is filtered out with an upper sideband bandpass filter to obtain an upper sideband signal which is combined with the coded pulse in a second mixer. The second mixer output is phased through a lower sideband bandpass filter to obtain an output pulse having a phase independent of the phase of the coded pulse input, a pulse width equal to that of the coded pulse, and a pulse amplitude proportional to that of the coded pulse. Pulse compression in the frequency domain is therefore accomplished.

4 Claims, 4 Drawing Figures

SYSTEM FOR OBTAINING PULSE COMPRESSION IN THE FREQUENCY DOMAIN

BACKGROUND OF THE INVENTION

1. Field of the Invention

The present invention relates generally to pulse compression and more particularly to pulse compression in the frequency domain whereby an output pulse is generated having the same pulse width as the phase coded input pulse but having a spectrum narrower than the phase coded pulse spectrum by a ratio equal to the reciprocal of the pulse width of the coded pulse.

2. Description of the Prior Art

Time domain pulse compression has been found to have particular utility in radar systems. In such systems, a comparatively long pulse is transmitted relative to the range resolution desired. When the echo of the transmitted pulse is received, a compression to the more desireable narrow pulse width is accomplished utilizing conventional time domain pulse compression techniques. Such techniques allow the range resolution accuracy attendant with narrow pulse widths at the high average power levels possible with long transmitted pulses. As a consequence, the pulse generating difficulties inherent with narrow pulses having high peak energies and are avoided.

In time domain pulse compression systems, the transmitted pulses are phase coded by linearly modulating the carrier frequency about a center value during the duration of the pulse transmission period or superimposing a pseudorandom phase coding on the transmitted pulse. In the receiver system, the coded signal is demodulated by passing it through a filter which is matched to the particular transmitted signal modulation code. Such a technique is described widely in the literature including "The Theory and Design of Chirp Radars" by J. R. Klander, A. C. Price, S. Darlington, W. J. Algersheim in *Bell System Technical Journal*, Vol. 34, July 1960 at pages 754–808; in *Radar Signals An Introduction to Theory and Application* by C. E. Cook, M. Burufeld, published by Academic Press; and in U.S. Pat. No. 3,686,572 entitled *Pulse-Compressor System*. Time domain pulse compression is thus a well known technique which decreases the demodulated (decoded) signal pulse width by a factor of the reciprocal of the bandwidth with the spectrum of the coded input and the decoded output being equal.

Although time domain pulse compression has many applications, situations arise in which the required matched filter cannot be utilized or the phase parameters of the received signal are not known. In addition, it may be preferable to demodulate the coded signal without down converting and passing through the matched filter required in time domain pulse compression systems.

SUMMARY OF THE INVENTION

The present invention accomplishes pulse compression in the frequency domain rather than pulse compression in the time domain. Thus, rather than a narrower output pulse having a spectrum which is equal to the spectrum of the received pulse, the present invention produces an output pulse compressed in the frequency domain having a time duration equal to the time duration of the transmitted pulse but a spectrum reduced by a factor of the reciprocal of the pulse width thus allowing narrow bandwidth receivers and better signal-to-noise ratio in the filtering process.

This result is achieved by inserting the phase coded input signal into two mixers coupled in parallel. The first mixer multiplies the coded pulse with a constant frequency signal generated by a local oscillator which follows a sinusoid having a constant frequency $\omega_1$. After passing the upper sideband of the output of the first mixer, the resultant signal has an amplitude which is proportional to the product of the amplitudes of the coded pulse and the constant frequency signal and a phase equal to the sum of the phases of these two inputted signals. The upper sideband of the first mixer output is then combined with the coded pulse in a second mixer, the second mixer output being filtered in a lower sideband bandpass filter to pass the lower sideband. The resultant lower sideband signal has an amplitude which is the product of the amplitudes of the two signals inserted into the second mixer and a phase equal to the difference between the phases of the two signals inserted into the second mixer. However, because the phase coding of the phase coded pulse and the upper sideband signal from the first mixer are the same, the phase coding cancels in the lower sideband of the second mixer output. Thus the decoded output has a phase equal to phase of the local oscillator output, a pulse width equal to the pulse width of the phase coded pulse input, and a pulse amplitude proportional to that of the coded input pulse. Pulse compression in the frequency domain is thus accomplished.

It is thus the general object of the present invention to perform pulse compression in the frequency domain.

It is another object of the present invention to remove phase coding from a phase coded input signal without knowing the phase parameters of the coded signal.

It is yet another object of the present invention to provide a system wherein demodulation of the phase coded signal may be accomplished without down-converting and passing through a matched filter.

Another object of the present invention is to provide a means for generating an uncoded test signal to be used with a coded pulse radar for measurement of the operating figure of merit such as signal-to-noise ratio enhancement. Thus, for the case of a number of different codes in a network of systems, a common decoding circuit may be provided without altering circuit parameters as required when a matched filter is utilized.

Still another object of the present invention is to provide a means for locating unkown signals by providing signal-to-noise ratio enhancement in the frequency domain to permit effective spectrum analysis of that signal. More specifically, the spectrum of a coded pulse is broad and has a low amplitude. Utilizing the present invention, spectral compression is accomplished which narrows the spectrum of the received signal and increases its amplitude to a point where it is easily detected.

Yet, another object of the present invention is to permit removal of any arbitrary phase code from a pulse of any time duration and of any time bandwidth product.

Still, another object of the present invention is to provide an extremely simple circuit adaptable to virtually any coded pulse without the necessity of knowing the time position of a coded pulse or series of coded pulses.

BRIEF DESCRIPTION OF THE DRAWINGS

A complete understanding of the present invention and of the above and other objects and advantages thereof may be gained from a consideration of the following detailed description taken in conjunction with the accompanying drawings in which.

DETAILED DESCRIPTION

Figure 1:
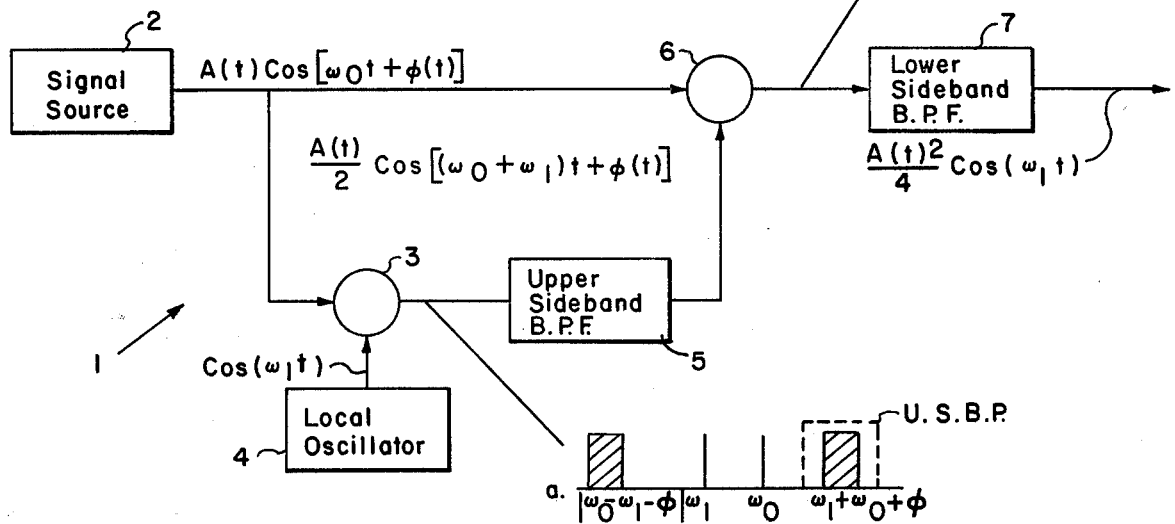
FIG. 1 is a simplified block diagram showing the circuit of the present invention and including spectral diagrams $a$ and $b$.
Figure 2A:
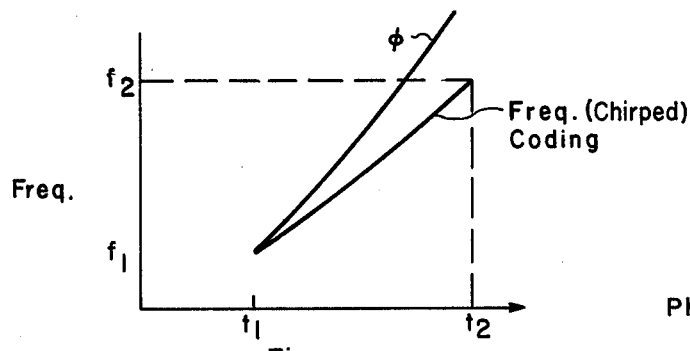
FIG. 2a is a graph illustrating a linear frequency coded pulse and the resultant phase variation.
Figure 2B:
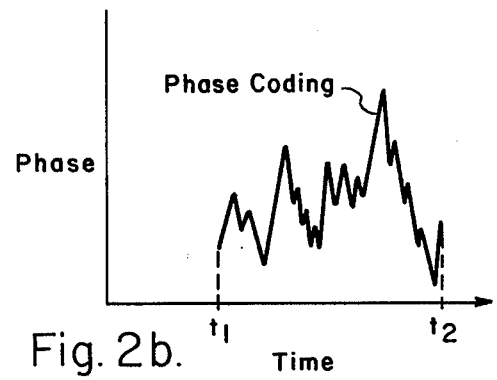
FIG. 2b is an example of a pseudorandom phase sequence which may be utilized in phase coding.

In accordance with the present invention, a chirped or phase coded pulse having the generalized form:

$$A(t) \cos(\omega_o t + \phi(t))$$

where $A(t)$ is the pulse envelope having a pulse width $t$, $\omega_o$ is the center frequency and $\phi(t)$ is the phase modulation which follows a square law for chirped coding or a pseudorandom phase sequence for phase coding, is injected into the circuit shown in FIG. 1. Encoding to obtain an input signal having the above form is well known and has been described in numerous articles including "The Theory and Design of Chirp Radars," by J. R. Klander, A. C. Price, S. Darlington and W. J. Algersheim in *Bell System Technical Journal*, Vol. 34, July 1960 at pages 754–808. In general, a chirped pulse is coded according to FIG. 2a where the frequency varies linearly from a first frequency $f_1$ to a second frequency $f_2$ over the time duration of the pulse. Because of the interdependence of phase and frequency as the frequency varies, the phase will also vary according to the curve $\phi$ of FIG. 2a. FIG. 2b illustrates a typical pseudorandum phase sequence type phase coding. Either of these coding schemes or a combination thereof may exist on the phase coded input signal.

Referring again to FIG. 1, the phase coded input signal from signal source 2 is injected into mixers 3 and 6 which are coupled in parallel. Also coupled to mixer 3 is local oscillator 4 to provide a signal having a constant frequency $\omega_1$. The output of mixer 3 is coupled to an upper sideband bandpass filter (B.P.F.) whose output is also injected into mixer 6. The output of mixer 6 is coupled to lower sideband B.P.F. 7 to yield a decoded output signal.

In operation, the coded pulse signal, $$A(t) \cos(\omega_o t + \phi(t)),$$

and the sinusoid from local oscillator 4, $\cos(\omega_1 t)$, are combined in mixer 3 to yield a resultant signal having the form:

$$(A(t)/2) \cos [(\omega_o + \omega_1)t + \phi(t)] + (A(t)/2) \cos [(\omega_o - \omega_1)t - \phi(t)]$$

where the net amplitude of the resultant signal is the product of the two input signals and the phase of the upper sideband of the resultant signal is the sum of the respective phases of the two signals and the phase of the lower sideband of the resultant signal is the difference between the phases of the two input signals. The resultant signal is passed through upper sideband B.P.F. 5 to obtain the upper sideband signal $$(A(t)/2) \cos [(\omega_o + \omega_1)t + \phi(t)].$$

The upper sideband signal and the phase coded signal are combined in mixer 6 to obtain the unfiltered second mixer output signal $$(A(t)^2/4) \cos [(2\omega_o + \omega_1)t + 2\phi(t)] + (A(t)^2/4) \cos (\omega_1 t).$$

Because the phase of the output pulse must be independent of the phase of the coded input pulse, the unfiltered output signal is passed through lower sideband B.P.F. 7 to obtain an output pulse having the general form:

$$(A(t)^2/4) \cos (\omega_1 t).$$

It will be appreciated that while various spurious cross products will be produced by the mixers, such cross products will be suppressed by the respective band pass filters.

FIGS. 1a and 1b show the resultant spectral densities of the signals at the output of mixers 3 and 4 respectively (spurious cross product terms not shown) with the upper sideband bandpass region (USBP) superimposed in FIG. 1a and the lower sideband bandpass region (USBP) superimposed in FIG. 1b. The spectra shown are for unbalanced mixers. However, it will be appreciated that the mixers may be either balanced or unbalanced without substantially effecting the operation of the present invention.

Figure 2C:
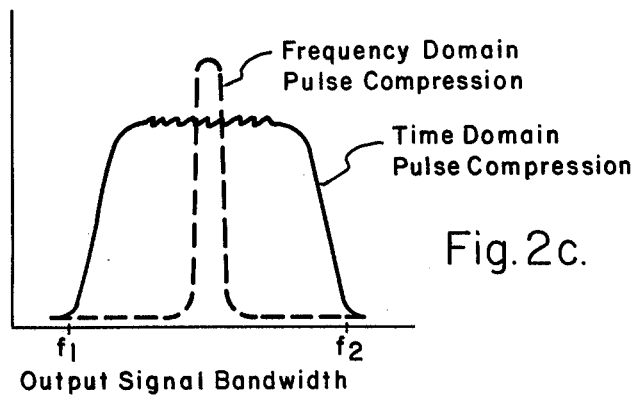
FIG. 2c is a plot showing the output signal bandwidth of time domain pulse compression and frequency domain pulse compression.

The present invention thus yields an output pulse signal $A(t)$ having a pulse width, $\tau$, equal to the pulse width of the phase coded input signal in a frequency spectrum which is equal to the reciprocal of the pulse width, $1/\tau$. FIG. 2c illustrates the system bandwidth required for a time domain pulse compression system versus a frequency domain pulse compression system provided by the present invention. Table I summarizes the differences between pulse compression of the time domain and pulse compression in the frequency domain:

TABLE I

| PULSE COMPRESSION | CODED PULSE INPUT PARAMETERS | | | UNCODED PULSE OUTPUT PARAMETERS | | |
|---|---|---|---|---|---|---|
| | Pulse Width | Band Width | Time Band Width Product | Pulse Width | Band Width | Time Band Width Product |
| Time Domain (Prior Art) | $\tau$ | $\beta$ | $\tau\beta$ | $1/\beta$ | $\beta$ | Unity |
| Frequency Domain (This invention) | $\tau$ | $\beta$ | $\tau\beta$ | $\tau$ | $1/\tau$ | Unity |

While the present invention has been described with particular reference to linear frequency modulation, (i.e., chirped or linear frequency coding) and pseudorandom phase coding, it will be appreciated that the present invention has many applications and may be utilized whenever it is desired to eliminate phase or frequency modulation from a signal (pulsed or otherwise) to decrease the frequency spectrum of the decoded output signal while maintaining a pulse width equivalent to the coded input signal. Thus, while FIG. 1 represents the preferred embodiment of the present invention, it will be obvious to those skilled in the art, that changes and modifications may be made without departing from the invention in its broader aspects and that the present invention may be utilized in any application where signal compression in the frequency domain is desired and therefore the aim in the claims is to cover all such changes and modifications as follows in the true spirit and scope of the invention.

What is claimed is:

1. A system for removing phase coding and distortion from a coded input pulse signal having a pulse width $\tau$ to achieve signal compression in the frequency domain comprising:
   a. a local oscillator for generating a constant frequency signal,
   b. a first mixer for combining the coded input pulse signal and the constant frequency signal to form a resultant signal,
   c. an upper sideband bandpass filter for processing the resultant signal to obtain an upper sideband signal,
   d. a second mixer for combining the coded input pulse signal and the upper sideband signal to obtain an unfiltered output signal, and
   e. a lower sideband bandpass filter coupled to the second mixer for filtering the unfiltered output signal to obtain an output pulse signal having a pulse width substantially equal to $\tau$ independent of the frequency or phase of the coded input signal.

2. The circuit of claim 1 wherein:
   a. the input pulse signal has the form:

$A(t) \cos(\omega_o t + \phi(t))$;

b. the constant frequency signal has the form:

$\cos(\omega_1 t)$;

c. the resultant signal has the form:

$(A(t)/2) \cos[(\omega_o + \omega_1)t + \phi(t)] + (A(t)/2) \cos[(\omega_o - \omega_1)t - \phi(t)]$;

d. the upper sideband signal has the form:

$(A(t)/2) \cos[(\omega_o + \omega_1)t + \phi(t)]$;

e. the unfiltered output signal has the form:

$([A(t)]^2/4) \cos(\omega_1 t) + ([A(t)]_2/4) \cos[(2\omega_o + \omega_1)t + 2\phi(t)]$; and f. the output pulse signal has the form:

$([A(t)]^2/4) \cos(\omega_1 t)$.

3. A pulse compression system for decoding a phase coded input pulse signal having a pulse width $\tau$ from a signal source comprising:
   a. a local oscillator;
   b. a first path sequentially including
      1. a first mixer having a first and a second input said first input being coupled to receive said input pulse signal from said signal source to generate a first mixer output, and
      2. a first filter for filtering one sideband of the first mixer output to obtain an output signal independent of the phase of the input pulse signal; and
   c. a second path sequentially including
      1. a second mixer having a first input coupled to said signal source and a second ipnut coupled to said local oscillator, and
      2. a second filter for filtering one sideband of the second mixer output to obtain an output pulse signal having a pulse width substantially equal to $\tau$, said sideband being different from the sideband filtered by said first filter, wherein said second mixer output is coupled to the second input of said first mixer.

4. A system for decoding a coded pulse signal having a pulse width $\tau$ and a center frequency $\omega_o$ from an input signal source, said system comprising:
   a. a local oscillator to supply a signal having a frequency $\omega_1$;
   b. a first path sequentially including a first mixer and a lower sideband bandpass filter; and
   c. a second path sequentially including
      1. a second mixer coupled to receive and mix said input pulse signal from the input signal source and said local oscillator signal, and
      2. an upper sideband bandpass filter coupled between said second and first mixer wherein said second mixer forms a signal having upper and lower sidebands separated from the center frequency $\omega_o$ by the frequency $\omega_1$, and said first mixer forms a signal having a first component at a frequency of $(2\omega_o + \omega_1)$ and a second component at a frequency of $\omega_1$, whereby said lower bandpass filter is oriented eliminate said first component to provide an output pulse signal having a frequency of $\omega_1$ and a pulse width substantially equal to $\tau$ said pulse signal being substantially free of phase coding.

* * * * *

UNITED STATES PATENT AND TRADEMARK OFFICE
CERTIFICATE OF CORRECTION

PATENT NO. : 4,092,603

DATED : May 30, 1978

INVENTOR(S) : John B. Harrington

It is certified that error appears in the above-identified patent and that said Letters Patent are hereby corrected as shown below:

Column 5, line 48, should be
$$\frac{A(t)}{2} \cos[(\omega_o + \omega_1)t + \phi(t)] + \frac{A(t)}{2} \cos[(\omega_o -$$

Column 5, line 54, should be
$$\frac{A(t)}{2} \cos[(\omega_o + \omega_1)t + \phi(t)];$$

Column 6, line 1, should be
$$\frac{[A(t)]^2}{4} \cos(\omega_1 t) + \frac{[A(t)]^2}{4} \cos[(2\omega_o + \omega_1)t +$$

Column 6, line 6, should be
$$\frac{[A(t)]^2}{4} \cos(\omega_1 t).$$

Column 6, line 22, --input-- instead of "ipnut".

Signed and Sealed this

Twenty-first Day of November 1978

[SEAL]

Attest:

RUTH C. MASON
Attesting Officer

DONALD W. BANNER
Commissioner of Patents and Trademarks